Patented Dec. 9, 1952

2,621,102

UNITED STATES PATENT OFFICE 2,621,102

TANNING WITH SULFONATE TANNING AGENTS AND A FORMALDEHYDE-ARYLAMINE-CYANAMIDE TYPE COMPOUND

Daniel E. Nagy, Stamford, Conn., assignor to American Cyanamid Company, New York, N. Y., a corporation of Maine No Drawing. Application December 6, 1947,
Serial No. 790,226

8 Claims. (Cl. 8—94.21)

This invention relates to leather manufacturing and it includes more particularly a product and a process in which hides and skins capable of tannage are impregnated with a sulfonate tanning agent and a basic poly-guanylarylalkene condensing agent to produce a new leather characterized by excellent qualities of plumpness, fullness, fine smooth grain and good feel.

The new condensing agents or assistants used in practicing the invention are salts of basic poly-guanylarylalkenes; i. e., salts of condensation products of a cyanamide and a diaminodiphenyl methane and its analogues which may be obtained by reacting an aryl amine with an aldehyde or a ketone. The condensing agents of my invention may be represented as compounds of the general formula

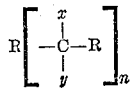

where each R is a monoguanidine or monobiguanide-substituted arylene radical, $n$ is any integer, preferably from 1 to 10, and $x$ and $y$ are hydrogen or hydrocarbon radicals of 1 to 3 carbon atoms. Where formaldehyde is used the new assistants are of the formula

where R and $n$ are as defined above.

The classes of compounds corresponding to the above formulae which may be used in practicing my invention are the di- and poly-guanidoarylene methanes and the di- and poly-biguanidoarylene methanes such as the di- and poly-guanidophenyl methanes and di- and poly-biguanidophenyl methanes which are obtained when varying ratios of formaldehyde are used as the condensing agent. The corresponding monoalkyl di- and poly-guanidoarylenes and biguanidoarylene methanes obtainable by condensation with acetaldehyde, propionaldehyde, butyraldehyde, etc. and the dialkyl di- and poly-guanidoarylene and biguanidoarylene methanes are produced by employing a ketone such as acetone as the condensing agent. Typical compounds of these classes which may be used are:

Guanido-phenyl methanes p,p' - Methylene - bis-(phenyl guanidine) also known as p,p'-diguanido diphenyl methane:

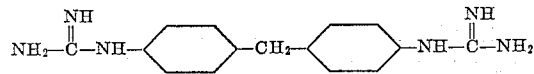

Poly-guanido-phenyl methane:

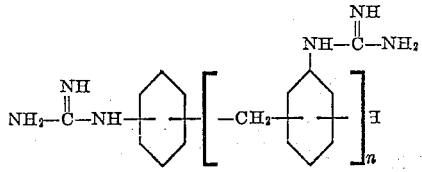

where $n$ is an integer from 1 to 10 inclusive.
In the above formula where $n$ is 2, the formula becomes:

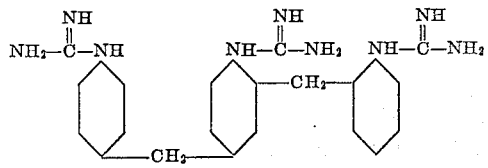

p,p'-Methylene-bis-(1-phenyl-1-ethanol guanidine)

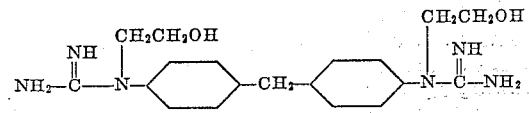

p,p'-Methylene-bis-(meta tolyl guanidine):

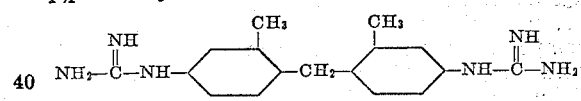

Biguanido-phenyl methanes p,p' - Methylene - bis-(phenyl biguanide) also known as p,p'-di-biguanido di-phenyl methane:

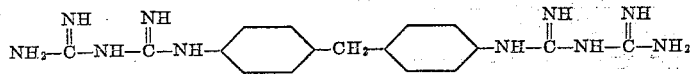

Poly-biguanido-phenyl methane:

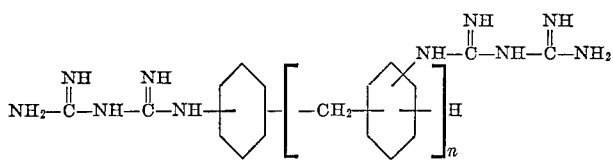

where n is an integer from 1 to 10.

p,p'-Methylene-bis-(ortho tolyl biguanide):

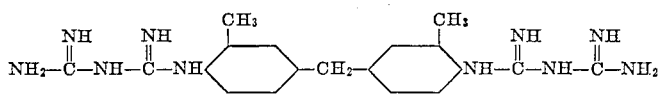

p,p' - Methylene-bis - (1 - phenyl - 5 - isopropyl biguanide):

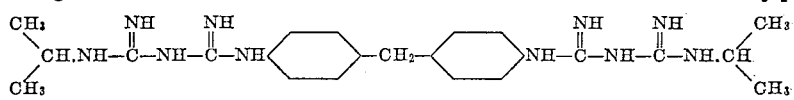

*Guanido and biguanido phenyl alkenes* p,p'-Propylidene-bis-(phenyl guanidine):

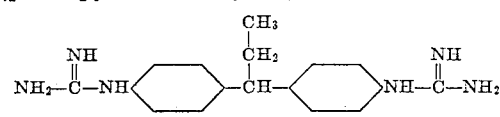

p,p'-Isopropylidene-bis-(phenyl biguanide):

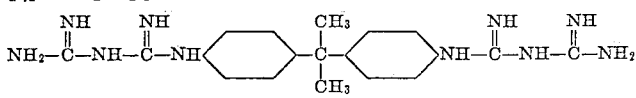

*Guanido and biguanido arylene methanes*

7,7'-Methylene-bis-(2-naphthyl guanidine):

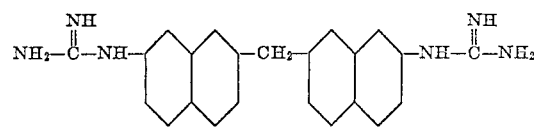

*Guanyl arylene alkenes*

7,7'-ethylidene-bis-(1-beta naphthyl-5-butyl biguanide):

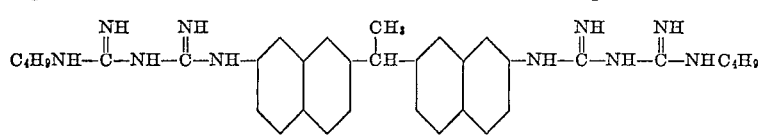

Such compounds, as will be discussed in more detail in following paragraphs, are obviously cyanamide or dicyandiamide reaction products of condensation products of aryl hydrocarbon monoamines of either the benzene or naphthalene series with formaldehyde, acetaldehyde, propionaldehyde or acetone.

The salts of basic poly-guanylarylakenes referred to are used in conjunction with sulfonate tanning agents as condensing agents. As is well known in the art sulfonate tanning agents are agents containing sulfonic acid groups; compounds obtained by sulfonating phenol resins; compounds containing two or more aryl sulfonic acid groups joined together by methylene or other linkages; e. g., dinaphthyl methane disulphonic acid and other products obtained by sulfonating coal tar residues; and compounds that are variously known as lignin sulfonates, sulfited lignins or sulfited cellulose waste materials.

The tanning agents and condensing agents of my invention are employed by impregnating hides and skins capable of tannage with these agents to produce a novel leather characterized by its excellent plumpness, fullness, fine smooth grain and good feel. Untanned hides and skins or hides and skins which have been partially tanned may be treated in my process so long as they are capable of further tannage. It may be used on limed, bated or pickled stock or stock prepared for retannage such as natural vegetable tanned or chrome tanned leathers and leathers of other mineral or chemical tannage, such as alum, formaldehyde, etc. Depending upon the product and the individual practice preferred in any particular tannery, it may be desired to impregnate the hides and skins capable of tannage simultaneously with the tanning agents and the condensing agents in my process. Acceptable results will be obtained by such practices in that the leather will have the plumpness, fullness and grain and feel characteristics referred to. I prefer, however, to first impregnate the hides and skins with a tanning agent and then follow with an impregnation by the condensing agent.

Although I do not wish to be limited to any particular theory it is possible that the condensing agents of my invention displace to a limited extent some of the sulfonic acid groups of the sulfonate tanning agent from their combination with the hide substance and permit the formation of larger molecules involving the condensing agent, sulfonate tanning agent and the collagen of the hides and skins. This higher molecular structure may account for the true tanning character of my process and the fullness and plumpness of the leather together with the strength of the grain and feel of the leather.

In the tannery leather is produced by various processes depending upon the size, weight and thickness of the hides and skins and upon the types of leather desired. The various processes are carried out in either a drum or a vat in the so-called "rocker yard-vat system." Leather has been produced in the past by impregnating hides and skins with natural vegetable tannins or with chrome, alum or formaldehyde as tanning agents. The alum and formaldehyde tannages or a combination of them are used to produce white leather. Retanned types of leather are also produced by retanning a vegetable tanned leather with a chrome tannage or retanning chrome stock with vegetable tannage. My process may be carried out in either or both the drum or the rocker-vat systems to produce leathers which may be substituted for these products of the prior processes and which leathers are equivalent to or superior to the products of the prior processes.

In my process to produce a straight tanned leather as opposed to a retanned product, limed, bated or pickled hides and skins may be treated with from 8 to 60 parts or more, and preferably 15 to 30 parts, of a sulfonate tanning agent based on 100 parts of the wet weight of the stock and with from 3 to 10% of a basic poly-guanylaryl-alkene based on the amount of the sulfonate tanning agent used. The above quantities of the tanning and condensing agents are based on the total active solids. In actual practice these agents are available in the form of solutions containing 20–40% active solids. The amount of the sulfonate tanning agent used will depend on the type of leather desired. Thus, for example, to produce a sole leather, the higher amounts of the sulfonate tanning agent may be used, whereas for a light upper leather or side leather, lesser amounts are used generally. When a sulfited lignin type of sulfonate tanning agent is used, a product corresponding to natural vegetable tanned leather is obtained which is superior to natural vegetable tanned leather in its qualities of plumpness, fullness, feel and strength of grain. When a naphthalene sulfonic acid type of sulfonate tanning agent is used, a white leather is produced which also is characterized by the superior qualities referred to.

In producing retanned leathers such as a retanned vegetable stock, any desired degree of tannage may be contributed by my tanning process and will depend in part on the degree of tannage already contributed by the vegetable tannins. It will also, of course, depend upon the product desired. In general where a high degree of tannage has been contributed by the natural vegetable material, a lower degree of tannage will ordinarily be contributed by my process. Where it is desired to follow my tannage with a vegetable retanning process, the above comments apply, except that the degree of tannage contributed by the vegetable tanning material will depend upon the degree of pretannage by my process. The quantities of the tanning agents and the condensing agents used may be the same as discussed in connection with the straight tannage. The amounts will vary within these ranges depending upon the final leather product desired.

In producing a retanned chrome leather, it is possible first to apply my tannage and follow with a chrome retannage, or to first apply the chrome and then follow with my tannage. In most cases the latter method is preferred. Limed, bated or pickled stock is usually tanned with from ½ to 5% $Cr_2O_3$ based on the wet weight of the stock and is then retanned using the quantities described in connection with straight tannage. That is to say, from 8 to 60 parts or more of total active solids of a sulfonate tanning agent may be used and followed with from 3 to 10% of total active solids of the basic poly-guanylarylalkene based on the amount of sulfonate tanning agent. When the retanned leather is to be made by first applying my tannage, followed by the chrome tannage, the same quantities of my materials may be used except that they are applied before the chrome.

My process may be also used in the bleaching operation. When chrome stock is to be bleached, for example, ¼ to 5% of the sulfonate tanning agent may be used based on the wet weight of the stock, and from 5 to 50% of my condensing agent, based on the sulfonate bleaching agent. These same quantities may be used when any type of leather is to be bleached using my process, and although any type of sulfonate tanning agent may be used, depending on the color desired, it is preferred to use the naphthalene sulfonic acid type since these will yield a lighter colored product which is most generally desired in the industry. When practicing my process in the bleaching operation a true tannage is involved rather than simply lightening the color which is obtained when a simple acid is used in the bleaching. Even though the quantities given for carrying out the bleaching operation are relatively much smaller than those involved for a straight tannage or a retannage, the final leather product has the characteristic plumpness, fullness, smoothness of grain and feel of my tannage although, of course, under these circumstances these characteristics are present to a lesser extent.

From the above discussion it will be apparent that the quantities of materials used in practicing my tanning process will vary over a wide range depending upon the use and the product that it is desired to produce. This range may extend from ¼ to 60 parts or more of total active solids of a sulfonate tanning agent based on the wet weight of 100 parts of stock and from 3 to 50% of total active solids of the condensing agent based on the weight of the sulfonate tanning agent. In the case of straight and retanned leather, 8 to 60 parts, and preferably 15 to 30 parts, of total active solids of the sulfonate tanning agent may be used with from 3 to 10% of total active solids of the condensing agent based on the tanning agent. While in the case of bleaching operations, ¼ to 5% of the sulfonate tanning agent may be used and from 5 to 50% of the condensing agent based on the tanning agent. It will be noted that the bases for calculating the amount of sulfonate tanning agent to be used are the parts of the wet weight of the stock to be treated and the basis for the amount of the condensing agent is the amount of sulfonate tanning agent and that the amounts of both the tanning and condensing agents are given in terms of active solids. This method of reference has been used for convenience. Actually in applying the sulfonate tanning agent, it is applied in the form of a solution containing from 20–40% active solids depending upon the product produced and whether or not a drum or a standard rocker and vat system is used. The condensing agent is usually applied in the form of a solution containing about 30% of a salt of a basic poly-guanylarylalkene.

As stated above, the condensing agents may be represented by the general formula:

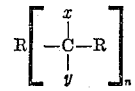

where R may be monoguanido or monobiguanido-substituted arylene radicals and $x$ and $y$ may be hydrogen or hydrocarbon radicals of one to three carbon atoms, and $n$ is an integer, preferably from 1 to 10. Dimers may be prepared directly by reacting a diaminodiphenyl methane with a cyanamide or dicyandiamide to produce a diguanido or dibiguanido phenyl methane. The salts are formed by carrying out the reaction under acid conditions, usually within a pH range of 1 to 6 using any acid forming at least a partially soluble salt with these compounds.

My condensing agents are preferably prepared by reacting an arylamine with an aldehyde and then reacting this reaction product with a cyanamide or a dicyandiamide and forming salts by carrying the reaction out under acid conditions, usually within the pH range of 1 to 6, using any acid forming at least a partially soluble salt. By varying the ratio of the aldehyde to the amine, a product is produced which is a mixture of polymers in which any particular polymer may be made to predominate. The size of the predominating polymer increases as the ratio of the aldehyde to the amine increases until, theoretically, the polymer is of infinite size when this ratio reaches the value 1. Thus, for example, when two mols of the amine are used for each mol of the aldehyde, the dimer will predominate. When 3 mols of the amine are used for each 2 mols of the aldehyde, the trimer will predominate. Molar ratios between the dimer and trimer will produce various mixtures of the dimer and trimer depending upon the molar ratio. In carrying out my process, polymers containing up to 10 monoguanido and monobiguanido-substituted phenylene radicals are preferred. Aniline, aniline-formaldehyde condensation products and simple guanidines and biguanides do not appear to give the desired results. Apparently this is due to the fact that they are not both guanyl compounds and polymers in structure.

The principal functional groups of these compounds appear to be the alkylene group, the arylene group and the guanyl group. The alkylene group is supplied, for example, by formaldehyde or acetone. The aryl group, which is preferably a phenylene group containing at least two active positions, is supplied by the aryl amine, and the guanyl group, which is either a guanidine or a biguanide group, is supplied by a cyanamide or a dicyandiamide. Each of the functional groups may contain non-functional substituents so long as the final condensing agent is at least partially water-soluble. Thus, for example, the alkylene group may be derived from formaldehyde, acetaldehyde, butyraldehyde or acetone. Where the alkylene group is other than

it is preferred that the substituents which may replace either or both hydrogens be a radical of 1 to 3 carbon atoms, i. e., it is preferred that the alkylene group be derived from an aliphatic hydrocarbon aldehyde or ketone wherein any aliphatic hydrocarbon groups contain from 1 to 3 carbon atoms. The arylene radical, which is preferably a phenylene group, may contain substituents such as chlorine, alkyl or aliphatic substituents. The guanido and biguanido groups may contain aliphatic and aromatic substituents such as alkyl or aryl groups on the amino-nitrogen atom. It is preferred to use aliphatic or alkyl groups containing as many as up to 18 carbon atoms and aromatic groups containing up to 5 phenyl radicals or their equivalent. For economic reasons, and since the substituents have no appreciable effect on the results, salts of basic polyguanylarylalkenes derived from aniline or toluidine condensed with formaldehyde and further reacted with cyanamide or dicyandiamide are preferred.

As stated earlier, the sulfonate tanning agents used in my process are well known in the industry. They have been applied in the past with most success as assistants in the well-known processes that have been practiced heretofore. One of the principal advantages of my process is that these types of tanning agents, particularly the lignin sulfonate type, may now be used in conjunction with the salts of basic poly-guanylarylalkenes to produce a superior leather having a distinctive plumpness, fullness and fineness of grain, together with an excellent feel. This fact alone has tremendous implications to the economics of the tanning industry since it will permit replacing entirely such vegetable tanning materials as quebracho, chestnut, wattle, cutch, divi-divi, etc. by a readily available and cheaper domestic source of materials. My process is all the more important, particularly to that branch of the industry engaged in vegetable tanning, since the vegetable tannins with the exception of chestnut are imported from abroad and the overall supply is limited. Chestnut is available domestically but the supplies will be exhausted in the very near future since this material is obtained from stands of dead chestnut trees killed by the blight and new growth is prevented by the continuing prevalence of the blight.

Another important advantage of my invention as indicated heretofore is that it may be used to produce leathers which are substitutes for commercial leathers now available, while at the same time possessing superior characteristics of plumpness, fullness and smoothness of grain. Still another advantage is to be found in the flexibility of my process and in the relatively small quantities of materials that are required to obtain the characteristics of my tannage.

The invention will be illustrated in greater detail by the following specific examples which show the preferred methods of preparing the condensing agents and applying them in my process. It should be understood, however, that while these examples may describe some of the more specific features of the invention, they are given primarily for purposes of illustration and the invention in its broader aspects is not limited thereto.

EXAMPLE 1

*Preparation of diguanido-diphenyl methane*

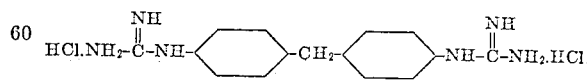

MATERIALS USED p,p'-Diamino-diphenyl methane. 40 gm. (0.20 mol)
Cyanamide solution 20% ____ 105 cc. (0.50 mol)
Hydrochloric acid, conc. _____ 38 cc. (0.45 mol)
Water _____ 150 cc.

The hydrochloric acid was added to the diamine after which the cyanamide solution was added at 95° C. After heating for one hour, the clear solution was cooled, filtered from the trace of insoluble matter and diluted to 15.5% active solids. When portions of this filtered solution were added to phenol sulfonic syntans, a completely insoluble precipitate was formed. A precipitate was also formed with all concentrations of sulfite lignin.

EXAMPLE 2

*Preparation of a poly-guanido-phenyl methane from aniline and formaldehyde*

MATERIALS USED

| | |
|---|---|
| Aniline | 93 gm. (1.0 mol) |
| Formaldehyde, 40% | 41.2 cc. (0.55 mol) |
| Hydrochloric acid, conc. | 92.4 cc. (1.1 mols) |
| Water | 150 cc. |
| Cyanamide, 22.5% | 205 cc. (1.1 mols) |

The formaldehyde was added during one-half hour at 95° C. to the aqueous aniline hydrochloride solution. After heating for three additional hours, 20 cc. of 10% sodium hydroxide was added and then the cyanamide solution was added in about ten minutes. After a further two-hour heating period at 95° C., the yellowish-red solution was cooled, filtered from the trace of precipitate and diluted to 24% active solids.

Another solution was prepared by methods similar to that outlined above except that 50 cc. of water was used to dilute the formaldehyde which was then added to the aniline over a period of 3 hours. Two additional solutions were made similar to that described above except that 48.6 cc. (0.65 mol) and 56.2 cc. (0.75 mol) of formaldehyde were used respectively for the addition to the aniline.

In the reaction of an aldehyde with an aryl amine condensed with cyanamide or dicyandiamide mixtures of poly-aryl guanidines may be formed. The predominant polymer obtained will depend on the ratio of the aldehyde to the amine. All of the above poly-aryl guanidine solutions were yellowish-red in color and all gave the same type of precipitation described above. They may be represented as follows:

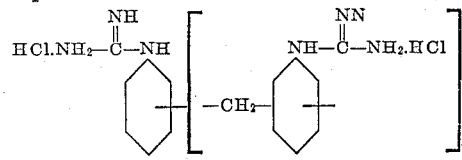

were $n$ is 1, 2, 3 and may be any whole number, preferably lower than 10.

EXAMPLE 3

*Preparation of a poly-aryl guanidine from phenyl-ethanol amine which was predominantly a dimer*

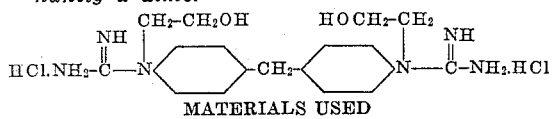

MATERIALS USED

| | |
|---|---|
| Phenylethanol amine | 137 gm. (1.0 mol) |
| Formaldehyde, 40% | 41.2 cc. (0.55 mol) |
| Hydrochloric acid, conc. | 92.4 cc. (1.1 mols) |
| Water | 150 cc. |
| Cyanamide, 22.5% solution | 205 cc. (1.1 mols) |

The aromatic amine hydrochloride was first condensed with the formaldehyde and then with the cyanamide solution, exactly as described in Example 2. The final clear brown solution was diluted to 615 cc. or 30% active solids.

Various substituents may be used instead of the ethanol groups. Thus, for example, any aliphatic or aryl group containing as many as up to 18 or more carbon atoms may be used.

EXAMPLE 4

*Preparation of a p,p'-di-biguanido-diphenyl methane*

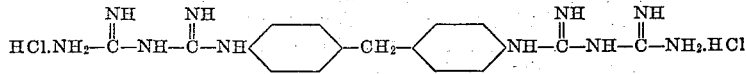

MATERIALS USED

| | |
|---|---|
| p,p'-Diamino-diphenyl methane. | 50 gm. (0.25 mol) |
| Dicyandiamide | 45 gm. (0.535 mol) |
| Hydrochloric acid conc. | 45 cc. (0.53 mol) to 100 cc. with water |
| Water | 150 cc. |

The diluted hydrochloric acid was added at 95° C. to the amine-dicyandiamide mixture in one hour and the solution heated for three hours at 95° C. The final clear cooled solution was diluted to 316 cc. or 29% active solids. No precipitation or other apparent change took place when the solution was stored for ten months.

EXAMPLE 5

*Preparation of a poly-aryl biguanide from aniline*

MATERIALS USED

| | |
|---|---|
| Aniline | 93 gm. (1.0 mol) (plus 50 cc. of water) |
| Formaldehyde, 40% | 41.2 cc. (0.55 mol) (plus 50 cc. of water) |
| Hydrochloric acid, conc. | 92.4 cc. (1.1 mols) (plus 50 cc. of water) |
| Dicyandiamide | 92.4 gm. (1.1 mols) |

The diluted formaldehyde was added at 90° C. during one-half hour to the aniline hydrochloride solution. After three more hours at 90–95° C. the solid dicyandiamide was added and the solution heated for 1.5 hours. The cooled red-brown solution measuring 465 cc. contained a calculated amount of active solids equivalent to 40.6%.

By varying the ratio of the formaldehyde to the aniline, poly-aryl biguanides are formed which may be represented as:

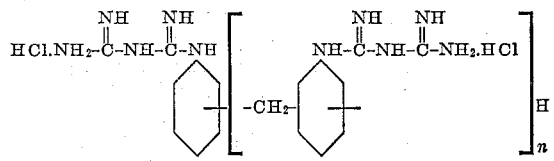

where $n$ above is 1 and 2 and may be any whole number, preferably less than 10.

EXAMPLE 6

*Preparation of a di-biguanido-diphenyl methane derivative from p,chloroaniline*

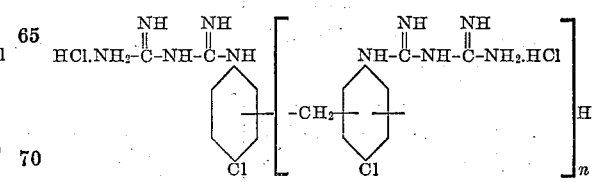

where the mixture is one in which $n$ is predominantly 1 and 2.

To 127.4 gm. (1.00 mol) of p,chloroaniline was added 100 ml. of water and 95 ml. (1.10 mol) of conc. hydrochloric acid. The mixture was stirred and heated to 93° C. and a clear solution of the salt resulted having a pH below 2.0.

50 ml. of water was used to dilute 45.7 ml. (0.61 mol) of 40% formaldehyde. This diluted solution was added dropwise to the p,chloroaniline solution over a period of one hour. The clear cherry red solution was heated to 93° C. for two hours. The solution was still very strongly acid.

93 gm. (1.1 mols) of dicyandiamide was then added and the solution was heated for two hours. At the end of the first hour the pH of the solution was found to be about pH 4, and crystals began to separate from the hot liquid; after two hours the solution was allowed to cool and a layer of crystals separated out.

The cool solution was diluted to 1454 cc. (15% solids by volume) and the temperature was raised to 95° C. to take most of the crystals into solution. On cooling, solids again separated out, amounting to about 10% of insolubles. The supernatant liquor was a clear, dark red liquid which as such, or in a diluted form, was precipitated by a dilute solution of a sulfite lignin liquor.

EXAMPLE 7

A poly-aryl guanidine from acetaldehyde was formed from the following materials:

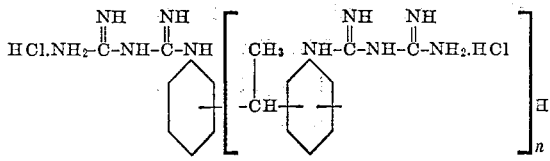

where the mixture is one in which $n$ is predominantly 1 and 2.

Aniline _____ 93 gm. (1 mol)
HCl (conc. 37%) __ 93 cc. (1.1 mols)
Acetaldehyde ____ 27.3 gm. (0.61 mol)
Water _____ 150 cc. (additional added at end of reaction to make 30% solids by weight)
Dicyandiamide ____ 93 gm. (1.1 mols)

150 cc. of water was mixed with the aniline, and the hydrochloric acid was then added over a period of about 20 minutes, after which the acetaldehyde was added slowly and the mixture heated further on a steam bath for about 2 hours, after which the dicyandiamide was added and the solution was stirred for an additional 3 hours with heating. The final pH was about 4 and a precipitate formed rapidly when the solution cooled. The solution was tested with a naphthalene sulfonic acid syntan and a sulfited lignin, and in both cases a precipitate formed.

Instead of the alkylene linkage of this example and the previous examples, the poly-aryl guanidines of my invention may have any alkylene linkage, preferably those containing as many as up to three carbon atoms such as would be obtained by using the corresponding aldehyde in the synthesis; e. g., butyraldehyde, propionaldehyde, etc.

EXAMPLE 8

A poly-aryl biguanide of the following formula was prepared:

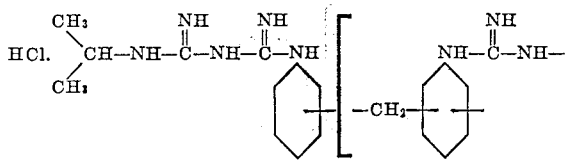

where $n$ is predominantly 1 and 2; i. e., predominantly a mixture of the dimer and the trimer.

MATERIALS USED

Aniline _____ 46.5 gm. (0.5 mol)
HCl (37%) _____ 46.2 cc. (0.55 mol)
CH$_2$O (40%) _____ 22.8 cc. (0.305 mol)
Isopropyl dicyandiamide ___ 75 gm. (0.595 mol)
Water _____ 75 cc.

55 cc. of water was added to 46.5 gm. of aniline contained in a flask. While stirring the mixture, the hydrochloric acid was added through a dropping funnel over a period of about 10 minutes. The solution was then heated to 95° C. on a steam bath, and the formaldehyde was then added over a period of about 10 minutes, after which the solution was maintained at a temperature of about 95° C. with stirring for a period of about 2 hours. The isopropyl dicyandiamide (also named 1-isopropyl 3-cyano guanidine) was then added and the solution was continually stirred for an additional 2 hours to complete the reaction. The pH of the finished solution was pH 3.6 and when diluted it formed precipitates with a naphthalene sulfonic acid type syntan as well as with a sulfited lignin.

Instead of the isopropyl substituent on the dicyandiamide any aliphatic or aryl substituent may be used so long as the final product is partially soluble. In general it is preferred to use aliphatic groups containing as many as up to 18 carbon atoms and aromatic groups containing as many as up to 5 phenyl groups or their equivalents.

EXAMPLE 9

A poly-aryl biguanide was formed from ortho-toluidine and the following materials:

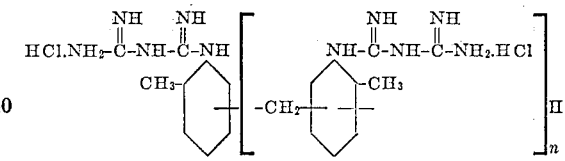

where $n$ is predominantly 2.

MATERIALS USED o-Toluidine _____ 107 gm. (1 mol)
HCl (37%) _____ 93 cc. (1.1 mols)
CH$_2$O (40% volume) _____ 45.7 cc. (0.61 mol)
Dicyandiamide_____ 93.0 gm. (1.1 mols)
Water_____ 150 cc.

95 cc. of water was added to 107 gm. of o-toluidine, and 93 cc. of HCl was added to the mixture through a dropping funnel, after which 47.5 cc. of formaldehyde and 50 cc. of water was added while the temperature of the mixture was maintained at 95° C. by means of a steam bath. The solution was maintained at this temperature for about 2 hours, during which time it was stirred and then 93 gm. of dicyandiamide was added and the heating and stirring was continued for another two hours. After the dicyandiamide addition, the pH of the solution was found to be pH 3.75. It was then diluted with water to a volume of 620 cc., and the product was tested with both a naphthalene sulfonic acid syntan and a sulfited lignin and formed precipitates with both of these materials.

The basic poly-guanylarylalkenes of my invention may include various substituents on the phenyl groups other than those of this example and Example 6. They may contain any aliphatic or alkyl constituent. In general it is preferred to use aliphatic groups containing as many as up to 18 carbon atoms and aromatic groups containing as many as up to 5 phenyl groups or their equivalents.

EXAMPLE 10

*Preparation of a p,p'-di-biguanido diphenyl dimethyl methane*

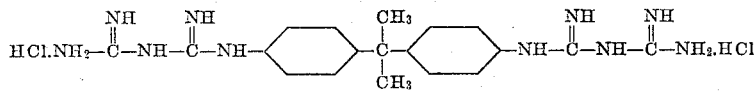

MATERIALS USED

| | |
|---|---|
| p,p'-Diamino-diphenyl dimethyl methane. | 113 gm. (0.5 mol) |
| Dicyandiamide | 100.8 gm. (1.2 mols) |
| HCl (conc.) | 94 cc. (1.1 mols) |
| H₂O | 400 cc. |

The diamine was added to the water after which the hydrochloric acid was added. The mixture was then heated to 90° C. to take the diamine into solution. The dicyandiamide was then added and the mixture was agitated by stirring for two hours while maintaining a temperature of 90° C. After this the clear solution was cooled and diluted to 30% active solids. The solution formed a precipitate with all concentrations of sulfited lignin.

EXAMPLE A

*Treatment of pickled stock*

Pickled stock may be treated with sulfited lignin and salt solution for from two hours to a number of days, or until penetration is complete. The amount of the sulfited lignin used may be varied depending on the kind and type of leather to be made. For example, from 50 to 150 parts of a sulfited lignin which contains, for example, 25% tannin may be used for each 100 parts of pickled weight of skin or hide. After the sulfited lignin treatment, the stock may be drained or pressed out lightly and then put into a dilute solution of a salt of a basic poly-guanylarylalkene and kept from one hour to as long as one day depending upon the thickness of the hide or skin. The amount of condensing agent used will depend upon the effect desired and upon the amount of the sulfited lignin used. Where, for example, a 30% poly-guanylarylalkene salt solution is used, as little as 3% or less of the weight of the sulfited lignin used will be effective, although as much as 10% or more may be used. Attention should be called at this point to the relatively small amounts of the poly-aryl guanidine required by my process. As discussed earlier this is one of the principal advantages of my invention.

In a typical run, 100# of pickled goatskins were drummed for two hours with 50# of sulfited lignin and 100# of water containing 2.5# of common salt. The skins were then pressed out lightly and drummed for one hour in 100# of water to which had been added 2½# of a 30% solution of diguanido-diphenyl methane. After the sulfited lignin addition the skins had an appearance which was very little different from the pickled stock, but after treatment with the guanidine compound, the skin had the appearance of a well-tanned, plump leather. After treating with the condensing agent, the skins were washed thoroughly without losing any of the sulfited lignin. They were then fat-liquored and finished in the usual manner.

Leather was also prepared in the manner described above, using the various examples of the compounds prepared in Examples 1 through 10 described above. In each case a uniform, plump, well-tanned leather was obtained which had an excellent color and feel, as well as a fine smooth grain.

In place of the sulfited lignin described above, pickled calfskins were treated with 15 tanning units of a sulfonated phenol resin until penetration was complete. The resin was prepared by treating a low molecular weight phenol resin with formaldehyde and sodium sulfite. The leather was washed and drummed with a dilute solution of the condensing agent of Example 5 and finished in the usual manner. The leather was more plump, full and soft than a corresponding sample using 30 tannin units of the resin alone and without the condensing agent. The same comparative differences were noted in the after-treatment of chrome leather.

EXAMPLE B

*Treatment of limed, bated stock*

Leather was prepared essentially as described in Example A, except that limed, bated stock was used instead of pickled stock. In this case the sulfited lignin was added to the limed, bated stock and the pH was adjusted to about pH 3 to 4, using an acid such as formic, lactic, or hydrochloric acid, preferably lactic. Runs were made using a condensing agent prepared as described in Examples 1 through 10. In each case a uniform, fine-grained, plump leather of excellent feel was obtained.

EXAMPLE C

*Treatment of chrome retan stock*

The combination of a sulfonate tanning agent, particularly a sulfited lignin, and the aryl guanidines of my process serves as a complete replacement for natural vegetable tannins usually used in the retannage of chrome leather to give leathers having a finer grain and greater uniformity. In a typical run, 100# of chrome tanned stock prepared in the usual manner was washed with water and then was treated with a 20% sulfited lignin solution in 100% of water (based on the drained weight of the chrome stock) and drummed for about one hour. The liquor was then discarded. A fresh liquor containing (on the basis of the drained weight of the chrome stock) 100% water and 2½% of 40% diguanido-diphenyl methane solution was then drummed into the stock for about an hour, after which the stock was allowed to drain. After this treatment, the stock was again drummed with 5% of sulfited lignin. The drumming continued for about an hour, after which the stock was fat-liquored in the drum in the usual manner. Runs were made using the compounds of Examples 1 through 10 and in all cases a uniform plump leather was obtained which had an unusually fine grain.

Although it is preferred to apply the sulfited lignin in a two-step process as described above, the second step may be dispensed with. If it is desired to dye the leather, the dye may be applied after the second application of the sulfited lignin or after the first application, if only one application is used.

EXAMPLE D

*Production of white leather*

Runs were made as described in Example A using the quantities described therein and the compounds of Examples 1, 2, 4, 5, and 9 except that instead of sulfited lignin, a naphthalene sulfonic acid syntan was used. In all cases a white, full, uniform, plump leather was produced which had an excellent feel and a fine grain. Although it is preferred to treat the hides with a naphthalene sulfonic acid syntan and then follow this treatment with a salt of a strongly basic aryl guanidine, comparable results may be obtained by treating the hides with these compounds simultaneously.

EXAMPLE E

*Preparation of a chrome retan leather using a naphthalene sulfonic acid syntan*

Runs were made as described in Example C, but instead of using a sulfited lignin, a naphthalene sulfonic acid syntan was used. In all cases a relatively white leather was obtained which was plump, and had fullness and evenness of color, together with a fine grain and good feel.

EXAMPLE F

*Bleached chrome leather*

100# of chrome tanned stock prepared in the usual manner was washed with water. The washed stock was then bleached in the following manner. The stock was put into a drum with 200# of water in which 3# of a solid naphthalene sulfonic acid were dissolved. The stock was drummed for 45 minutes at 50° C., then washed after which it was drummed for an additional 45 minutes at 50° C. in 200# of water containing 1.5# of a 30% solution prepared as described in Example 5. This quantity of condensing agent corresponds to 0.5# of active solids. The bleached leather was washed and finished in the regular manner. The final product was more plump and lighter in color than a similar run using the naphthalene sulfonic acid syntan alone and without the condensing agent. Similar results are obtained when the other compounds of Examples 1 through 10 are used.

EXAMPLE G

*A combination vegetable tanned leather*

Leather was prepared as described in Example A using the quantities and materials described therein. After the treatment with the condensing agent of Example 1, the stock was hung in a standard rocker system containing high concentrations of natural vegetable tannins having a barkometer reading from about 30 to 70 BK. After about two weeks the leather was withdrawn from the rocker system and finished with a regular sole leather finish in a manner well known in the art. A well-filled, strong-grained sole leather was obtained.

Instead of using the standard rocker system, the natural vegetable tannin may be applied in a drum, due care being exercised to prevent a flabby leather or a pebble-grain which is the result of too much drumming. The advantages of producing a sole leather as described in this example are that leather gains a considerable amount of weight in a matter of about two weeks; whereas to accomplish these same results by standard methods, as much as three months or more are usually required. It is possible to take the leather directly into strong, natural tannin solutions because the leather has been tanned by the combination of the sulfonate tanning agent and the condensing agent.

What I claim is:

1. A tanning process which comprises impregnating hides and skins capable of tannage with a solution of a sulfonate tanning agent and with a different solution of a water-soluble acid salt of a material obtained by condensing an aryl hydrocarbon monoamine selected from the group consisting of amines of the benzene and naphthalene series with a member of the group consisting of formaldehyde and aliphatic hydrocarbon aldehyde and ketones in which any aliphatic hydrocarbon group contains from 1–3 carbon atoms and then reacting the condensation product so obtained with a member of the group consisting of cyanamide and dicyandiamide, said material containing from 2–11 guanyl substituted arylene radicals.

2. A tanning process which comprises impregnating hides and skins capable of tannage with a solution of a sulfonate tanning agent and with a different solution of a water-soluble acid salt of a material obtained by condensing an aryl hydrocarbon monoamine selected from the group consisting of amines of the benzene and naphthalene series with an aliphatic hydrocarbon aldehyde in which any aliphatic hydrocarbon group contains from 1 to 3 carbon atoms and then reacting the condensation product so obtained with a member of the group consisting of cyanamide and dicyandiamide, said material containing from 2–11 guanyl substituted arylene radicals.

3. A tanning process which comprises impregnating hides and skins capable of tannage with a solution of a sulfonate tanning agent and with a different solution of a water-soluble acid salt of a material obtained by condensing an aryl hydrocarbon monoamine selected from the group consisting of amines of the benzene and naphthalene series with formaldehyde and then reacting the condensation product so obtained with a member of the group consisting of cyanamide and dicyandiamide, said material containing from 2–11 guanyl substituted arylene radicals.

4. A tanning process which comprises impregnating hides and skins capable of tannage with a solution of a sulfonate tanning agent and with a different solution of a water-soluble acid salt of a material obtained by condensing aniline with formaldehyde and then reacting the condensation product so obtained with cyanamide, said material containing from 2–11 guanyl substituted arylene radicals.

5. A tanning process which comprises impregnating hides and skins capable of tannage with a solution of a sulfonate tanning agent and with a different solution of a water-soluble acid salt of a material obtained by condensing aniline with formaldehyde and then reacting the condensation product so obtained with dicyandiamide, said material containing from 2–11 guanyl substituted arylene radicals.

6. A tanning process which comprises impregnating hides and skins capable of tannage with a solution of a sulfonate tanning agent followed by impregnation with a different solution of a water-soluble acid salt of a material obtained by condensing an aryl hydrocarbon monoamine selected from the group consisting of amines of the benzene and naphthalene series with a member of the group consisting of formaldehyde and aliphatic hydrocarbon aldehyde and ketones in which any aliphatic hydrocarbon group contains from 1–3 carbon atoms and then reacting the condensation product so obtained with a member of the group consisting of cyanamide and dicyandiamide, said material containing from 2–11 guanyl substituted arylene radicals.

7. A process according to claim 6 in which the sulfonate tanning agent is a sulfited lignin.

8. A process according to claim 6 in which the sulfonate tanning agent is a naphthalene sulfonic acid.

DANIEL E. NAGY.

REFERENCES CITED

The following references are of record in the file of this patent:

UNITED STATES PATENTS

| Number | Name | Date |
|---|---|---|
| 2,204,512 | Russel et al. | June 11, 1940 |
| 2,205,355 | Grim et al. | June 18, 1940 |
| 2,228,514 | Griessbach et al. | June 14, 1941 |
| 2,257,239 | Krzikalla et al. | Sept. 30, 1941 |
| 2,317,184 | Dreyfuss | Apr. 20, 1943 |
| 2,328,901 | Grim | Sept. 7, 1943 |
| 2,375,124 | McGregor | May 1, 1945 |